United States Patent
Katano et al.

(10) Patent No.: US 10,181,727 B2
(45) Date of Patent: Jan. 15, 2019

(54) FUEL CELL SYSTEM AND METHOD OF CONTROLLING OF A FUEL CELL SYSTEM

(71) Applicant: TOYOTA JIDOSHA KABUSHIKI KAISHA, Toyota-shi, Aichi-ken (JP)

(72) Inventors: Koji Katano, Toyota (JP); Masahiro Imanishi, Gotemba (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 186 days.

(21) Appl. No.: 15/401,397

(22) Filed: Jan. 9, 2017

(65) Prior Publication Data

US 2017/0207634 A1 Jul. 20, 2017

(30) Foreign Application Priority Data

Jan. 14, 2016 (JP) .................... 2016-004913

(51) Int. Cl.
 *H02J 3/38* (2006.01)
 *H02M 3/04* (2006.01)
 (Continued)

(52) U.S. Cl.
 CPC ........... *H02J 3/387* (2013.01); *B60L 11/1812* (2013.01); *B60L 11/1868* (2013.01);
 (Continued)

(58) Field of Classification Search
 CPC ...... H02J 3/387; H02J 7/34; H02J 1/06; H02J 2001/004; B60L 15/007; B60L 11/1887; B60L 11/1868; B60L 11/1812; B60L 2240/527; H02M 3/158; H02M 7/44; H02M 3/04; H02M 3/1582; H02H 9/001; H02P 27/06
 See application file for complete search history.

(56) References Cited

U.S. PATENT DOCUMENTS

2012/0086278 A1 4/2012 Kanie et al.

FOREIGN PATENT DOCUMENTS

JP 2004-166376 6/2004
JP 2010-288326 A 12/2010
(Continued)

*Primary Examiner* — Rexford Barnie
*Assistant Examiner* — Thai Tran
(74) *Attorney, Agent, or Firm* — Finnegan, Henderson, Farabow, Garrett & Dunner, LLP (57) ABSTRACT

A controller of a fuel cell system performs a starting operation that switches on a first precharge circuit so as to reduce a voltage difference between a first smoothing capacitor and a second smoothing capacitor and subsequently turns on a first relay, when a start switch is turned on in a system off state that the first relay is off. Upon satisfaction of a predetermined condition including at least one of a condition that a difference between the voltage of the first smoothing capacitor and the voltage of the second smoothing capacitor is equal to or greater than a first reference value and a condition that the voltage of the first smoothing capacitor is equal to or higher than a second reference value, the controller uses a second converter to charge the second smoothing capacitor so as to bring the voltage of the second smoothing capacitor closer to the voltage of the first smoothing capacitor, and subsequently switches the first precharge circuit from off to on. This configuration reduces the electric current flowing through a precharge circuit at the time of starting the fuel cell system.

8 Claims, 8 Drawing Sheets

(51) Int. Cl.

| | |
|---|---|
| *H02M 7/44* | (2006.01) |
| *H02P 27/06* | (2006.01) |
| *H02M 3/158* | (2006.01) |
| *H02H 9/00* | (2006.01) |
| *H02J 7/34* | (2006.01) |
| *B60L 11/18* | (2006.01) |
| *B60L 15/00* | (2006.01) |
| *H02J 1/06* | (2006.01) |
| *H02J 1/00* | (2006.01) |

(52) U.S. Cl.
CPC ......... *B60L 11/1887* (2013.01); *B60L 15/007* (2013.01); *H02H 9/001* (2013.01); *H02J 7/34* (2013.01); *H02M 3/04* (2013.01); *H02M 3/158* (2013.01); *H02M 3/1582* (2013.01); *H02M 7/44* (2013.01); *H02P 27/06* (2013.01); *B60L 2240/527* (2013.01); *H02J 1/06* (2013.01); *H02J 2001/004* (2013.01)

(56) References Cited

FOREIGN PATENT DOCUMENTS

| | | |
|---|---|---|
| JP | 2011-010508 | 1/2011 |
| JP | 2013-247084 | 12/2013 |
| JP | 2015-91207 | 5/2015 |
| WO | WO 2010/143260 A1 | 12/2010 |

Fig.9

FUEL CELL SYSTEM AND METHOD OF CONTROLLING OF A FUEL CELL SYSTEM

CROSS-REFERENCE TO RELATED APPLICATIONS

The present application claims priority from Japanese patent application 2016-4913 filed on Jan. 14, 2016, the content of which is hereby incorporated by reference into this application.

BACKGROUND

Field

The present disclosure relates to a fuel cell system and a method of controlling of a fuel cell system.

Related Art

A vehicle-mounted fuel cell system disclosed in JP 2015-91207A includes a fuel cell, an FC converter connected with the fuel cell, a secondary battery and a secondary battery converter connected with the secondary battery. Each of the FC converter and the secondary battery converter generally includes a smoothing capacitor. A drive motor for vehicle is connected with high voltage wiring placed between the FC converter and the secondary battery converter. A variety of auxiliary machines are connected with the secondary battery converter.

In the fuel cell system described above, a relay may be provided on a high voltage side of the FC converter to separate the FC converter and the fuel cell from the high voltage wiring. In the state that the fuel cell system of this configuration is at stop, since the electric power charged in the smoothing capacitor for the secondary battery converter is consumed by the auxiliary machines, the voltage of the smoothing capacitor for the secondary battery converter is decreased quickly. In the state that the fuel cell system is at stop, on the other hand, the smoothing capacitor for the FC converter is separated from the drive motor and the auxiliary machines by the relay. The voltage of the smoothing capacitor for the FC converter is thus less likely to decrease, compared with the voltage of the smoothing capacitor for the secondary battery converter. When the fuel cell system is restarted after elapse of only a short time period since a previous stop, the voltage of the smoothing capacitor for the FC converter is likely to be not sufficiently decreased, while the voltage of the smoothing capacitor for the secondary battery converter is sufficiently decreased. In this case, there is a large potential difference between the two smoothing capacitors. Accordingly connecting the relay in this state is likely to generate an excessively high current. This problem arises when a significantly large voltage difference is generated between two smoothing capacitors by any reason.

SUMMARY

In order to solve at least part the problems described above, the disclosure may be implemented by aspects described below.

(1) According to one aspect of the disclosure, there is provided a fuel cell system. The fuel cell system comprises; a fuel cell; a secondary battery; a first converter connected with the fuel cell, the first converter being provided as a DC-to-DC converter that includes a first, smoothing capacitor for use in stepping up voltage; a second converter connected with the first converter via high voltage wiring and connected with the secondary battery via low voltage wiring, the second converter being provided as a DC-to-DC converter that includes a second smoothing capacitor for use in stepping up voltage; a first relay provided in the high voltage wiring; a first precharge circuit connected in parallel to the first relay and configured as a bypass conduction path that is configured to be switched on and off and that includes a reactor or a resistance;

a voltage sensor configured to measure at least a voltage of the first smoothing capacitor, out of the voltage of the first smoothing capacitor and a voltage of the second smoothing capacitor; a start switch for use in switching on and off the fuel cell system; and a controller, wherein when the start switch is turned on in a system-off state where the first relay is off, the controller performs a starting operation that switches on the first precharge circuit so as to reduce a voltage difference between the first smoothing capacitor and the second smoothing capacitor and subsequently turns on the first relay; wherein in the starting operation the controller obtains at least the voltage of the first smoothing capacitor out of the voltage of the first smoothing capacitor and the voltage of the second smoothing capacitor, and upon satisfaction of a predetermined condition including at least one of a condition that a difference between the voltage of the first smoothing capacitor and the voltage of the second smoothing capacitor is equal to or greater than a first reference value and a condition that the voltage of the first smoothing capacitor is equal to or higher than a second reference value, the controller uses the second converter to charge up the second smoothing capacitor so as to bring the voltage of the second smoothing capacitor closer to the voltage of the first smoothing capacitor, and subsequently switches the first precharge circuit from off to on.

The configuration of this aspect uses the second converter to charge the second smoothing capacitor so as to bring the voltage of the second smoothing capacitor close to the voltage of the first smoothing capacitor, before switching the first precharge circuit from off to on. This configuration reduces the electric current flowing through the first precharge circuit when the first precharge circuit is switched on and thereby prevents the flow of an excessively high current.

(2) The fuel cell system according to the above aspect; wherein the first precharge circuit may include a precharge circuit relay configured to switch on and off the first precharge circuit, and the voltage sensor may include a first voltage sensor configured to measure the voltage of the first smoothing capacitor and a second voltage sensor configured to measure the voltage of the second smoothing capacitor wherein in the starting operation the controller may switch the precharge circuit relay from off to on so as to switch on the first precharge circuit, when the voltage of the second smoothing capacitor becomes higher than the voltage of the first smoothing capacitor by a predetermined reference value or more after the charging up of the second smoothing capacitor.

A large-capacity relay generally has polarity. Adapting the polarity of a relay for the direction of electric current that flows through the relay when the relay is switched from off to on enables downsizing of the relay or simplifies the configuration of the relay. In the fuel cell system of this aspect, the controller switches the first precharge circuit from off to on, when the voltage of the second smoothing capacitor becomes higher than the voltage of the first smoothing capacitor by the predetermined reference value or more after charging the second smoothing capacitor. This configuration limits the direction of electric current flowing through the precharge circuit relay when the first precharge circuit is switched from off to on, to only one direction. As a result, this enables downsizing of the precharge circuit relay or simplifies the configuration of the precharge circuit relay and thereby enables downsizing of the first precharge circuit.

(3) The fuel cell system according to the above aspect may further comprises: a second relay provided in the low voltage wiring; and a second precharge circuit connected in parallel to the second relay, wherein the second converter may include a third smoothing capacitor for use in stepping down voltage provided on a low voltage wiring side thereof, wherein in the starting operation the controller may use the second battery to charge up the third smoothing capacitor via the second precharge circuit, before the charging up of the second smoothing capacitor.

The configuration of this aspect switches on the second precharge circuit to charge the third smoothing capacitor, before charging the second smoothing capacitor. This configuration prevents an excessively high current from flowing in the process of charging the second smoothing capacitor.

The disclosure may be implemented by any of various aspects other than the fuel cell system, for example, a vehicle equipped with the fuel cell system, a moving body equipped with the fuel cell system or a method of controlling of a fuel cell system.

DESCRIPTION OF EMBODIMENTS

First Embodiment

Figure 1:
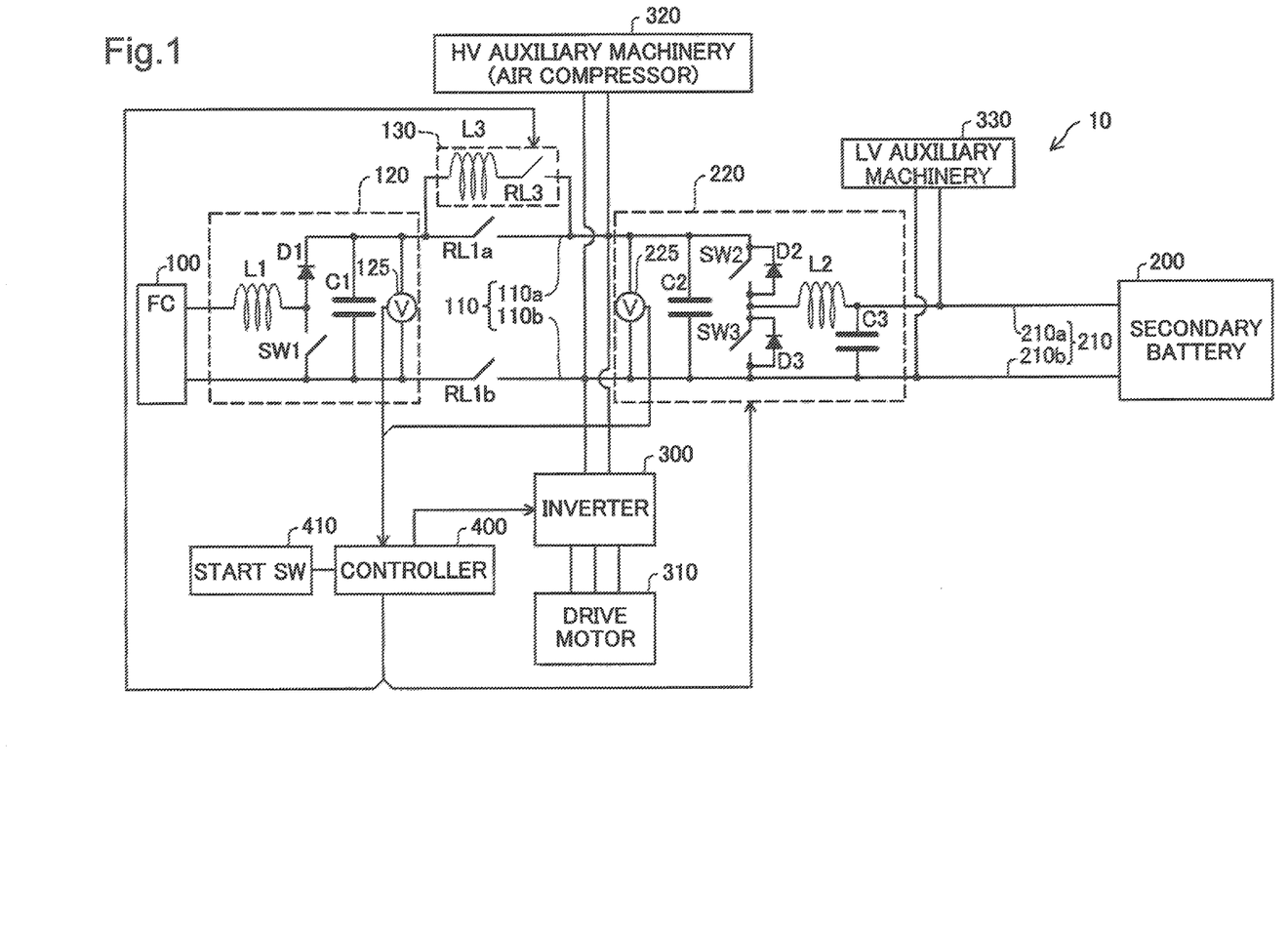
FIG. 1 is a diagram illustrating the schematic configuration of a power circuit of a fuel cell system.

FIG. 1 is a diagram illustrating the schematic configuration of a power circuit of a fuel cell system 10. This fuel cell system 10 is mounted on a moving body such as a vehicle. The fuel cell system 10 may include a fuel cell 100, high voltage wiring 110, a first converter 120, a first precharge circuit 130, a secondary battery 200, low voltage wiring 210, a second converter 220, an inverter 300, a drive motor 310, high voltage auxiliary machinery 320 (shown as "HV auxiliary machinery" in the drawings), low voltage auxiliary machinery 330 (shown as "LV auxiliary machinery" in the drawings), a controller 400 and a start switch 410. The first converter 120 and the second converter 220 are DC-to-DC converters.

The fuel cell 100 serves as a power generator configured to generate direct current power by reaction of a fuel gas and an oxidizing gas. The fuel cell 100 is connected with the first converter 120.

The first converter 120 may be a non-insulated type chopper converter configured to step up a voltage of the fuel cell 100 and transmit the stepped-up voltage to the high voltage wiring 110. The first converter 120 may include a reactor L1, a diode D1, a switch SW1 and a first smoothing capacitor C1 for boosting (also called "FDC capacitor C1"). The switch SW1 may be formed from, for example, a semiconductor element such as IGBT. The first smoothing capacitor C1 is provided with a first voltage sensor 125 configured to detect the voltage of the first smoothing capacitor C1. The output voltage of the fuel cell 100 is stepped up by the first converter 120 and is transmitted to the high voltage wiring 110.

The high voltage wiring 110 may include high potential-side wiring 110a and low potential-side wiring 110b and is connected with the second converter 220. The high potential-side wiring 110a may include a relay RL1a (first relay), and the low potential-side wiring 110b may include a relay RL1b. The relay RL1b of the low potential-side wiring 110b may be omitted as appropriate.

The first precharge circuit 130 may include a reactor L3 and a relay RL3 (relay for precharge circuit) that is connected in series with the reactor L3. The relay RL3 is turned on only during precharge described later and is otherwise normally off. The first precharge circuit 130 is connected with the high potential-side wiring 110a to be in parallel to the relay RL1a (first relay). In other words, this first precharge circuit 130 may be configured as a bypass conduction path including the reactor L3.

The inverter 300 is connected on the second converter 220-side of the relays RL1a and RL1b of the high voltage wiring 110. The inverter 300 may be configured to convert the direct current power supplied from the fuel cell 100 into, for example, three-phase alternating current power and supply the three-phase alternating current power to the drive motor 310. The drive motor 310 serves as a motor configured to drive the wheels (not shown) of the moving body. The high voltage auxiliary machinery 320 is connected on the second converter 220-side of the relays RL1a and RL1b of the high voltage wiring 110. The high-voltage auxiliary machinery 320 may include an air compressor (not shown) configured to supply the air to the fuel cell 100. According to this embodiment, the air compressor is configured to be driven with direct current, so that the high voltage auxiliary machinery 320 is connected with the high voltage wiring 110. According to another embodiment, when the air compressor is configured to be driven with alternating current, an inverter may be provided between the high voltage wiring 110 and the high voltage auxiliary machinery 320 (air compressor).

The secondary battery 200 may be configured by, for example, a nickel metal hydride battery or a lithium ion battery. The secondary battery 200 is connected with the second converter 220 via the low voltage wiring 210.

The low voltage wiring 210 may include high potential-side wiring 210a and low potential-side wiring 210b. The low voltage auxiliary machinery 330 is connected with the low voltage wiring 210. The low voltage auxiliary machinery 330 may include an injector used to supply the fuel gas to the fuel cell 100 and motors (not shown) provided to actuate various valves in a fuel system.

The second converter 220 may be configured to step up the voltage of the low voltage wiring 210 (secondary battery 200) and transmit the stepped-up voltage to the high voltage wiring 110 and may also be configured to step down the voltage of the high voltage wiring 110 and transmit the stepped-down voltage to the low voltage wiring 210 (secondary battery 200). Accordingly the second converter 220 may be configured to perform two-way voltage conversion. The second converter 220 may be a non-insulated type chopper converter and may include a rector L2, diodes D2 and D3, a switch SW2 for stepping down, a switch SW3 for stepping up, a second smoothing capacitor C2 for stepping up (also called PCU capacitor C2) and a third smoothing capacitor C3 for stepping down. The second smoothing capacitor C2 is provided with a second voltage sensor 225 configured to detect the voltage of the second smoothing capacitor C2.

The controller 400 is configured to control the respective components of the fuel cell system 10. For example, the controller 400 uses the first voltage sensor 125 to obtain the voltage of the first smoothing capacitor C1, uses the second voltage sensor 225 to obtain the voltage of the second smoothing capacitor C2, and controls the operations of the second converter 220 and the first precharge circuit 130. According to another embodiment, the controller 400 may be provided, as an exclusive controller that is exclusively used for a starting operation and may be included in part of the functions of another control unit (ECU, not shown). The start switch 410 is connected with the controller 400. The start switch 410 serves as a switch configured to start and stop the fuel cell system 10.

FIG. 1 illustrates a system off state in which the start switch 410 is off. When the start switch 410 is off, the relays RL1a and RL1b of the high voltage wiring 110 are off. The relay RL3 of the first precharge circuit 130 is also off. The switch SW1 of the first converter 120 and the switches SW2 and SW3 of the second converter 220 are also off in the illustrated state but may be on as appropriate. These switches SW1 to SW3 are controlled on and off during a stepping-up operation or during a stepping-down operation after an ON operation of the start switch 410. In the description hereof, both the terms "relay" and "switch" are used for switching devices configured to switch on and off the wiring. These terms are, however, not used to distinguish between different types of switching devices (for example, an electromagnetic relay and a semiconductor switch) but are simply used for the purpose of convenience. In the description hereof, a switching device that continuously keeps the power wiring on or continuously keeps the power wiring off is called "relay", and a switching device that continually switches on and off the power wiring is called "switch".

Figure 2:
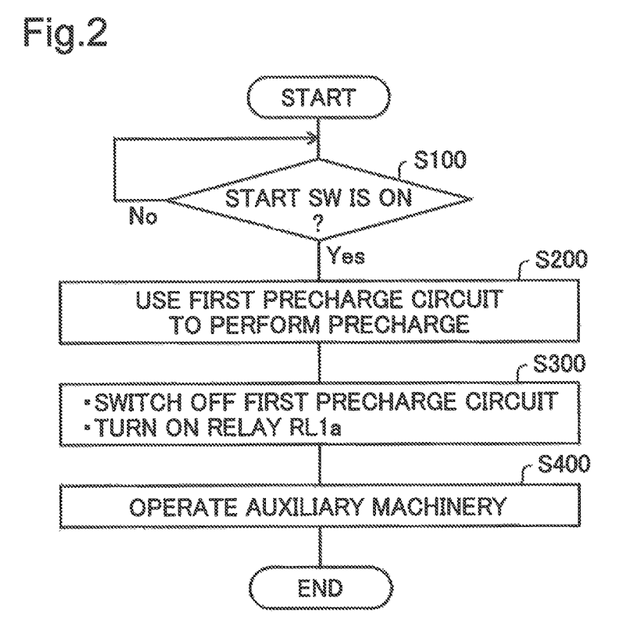
FIG. 2 is a flowchart showing a basic starting operation of the power circuit of the fuel cell system.

FIG. 2 is a flowchart showing a basic starting operation of the power circuit of the fuel cell system 10. When it is determined that the start switch 410 is turned on at step S100, the controller 400 proceeds to step S200. When it is determined the start switch 410 is not turned on, on the other hand, the controller 400 repeats the determination of step S100 and waits for an ON operation of the start switch 410. At step S200, the controller 400 uses the first precharge circuit 130 to precharge the first smoothing capacitor C1 and the second smoothing capacitor C2. The two smoothing capacitors C1 and C2 are made to have approximately equal voltages by this precharge operation. This precharge operation is performed because of the following reason. When the relays RL1a and RL1b are turned on without the precharge operation, a high current is likely to flow between the first smoothing capacitor C1 and the second smoothing capacitor C2. This leads to a need for high-capacity relays RL1a and RL1b corresponding to the high current. The controller 400 proceeds from step S200 to step S300 when a voltage difference between the two smoothing capacitors C1 and C2 becomes equal to or less than a predetermined value or when a predetermined time period has elapsed since an ON operation of the first precharge circuit 130. In other words, the controller 400 proceeds to step S300 after the first precharge circuit 130 is switched on to decrease the voltage difference between the first smoothing capacitor C1 and the second smoothing capacitor C2. At step S300, the controller 400 turns off the relay RL3 so as to switch off the first precharge circuit 130 and turns on the relay RL1a. At step S400, the controller 400 operates the auxiliary machinery 320 and 330 and makes the fuel cell 100 ready for power generation.

In the flow of FIG. 2 described above, a voltage VC1 of the first smoothing capacitor C1 and a voltage VC2 of the second smoothing capacitor C2 at the time when the start switch 410 is turned on are varied, depending on a time period between an OFF operation and a subsequent ON operation of the start switch 410. There is accordingly a possibility that a problem described below arises during the precharge operation at step S200.

Figure 3:
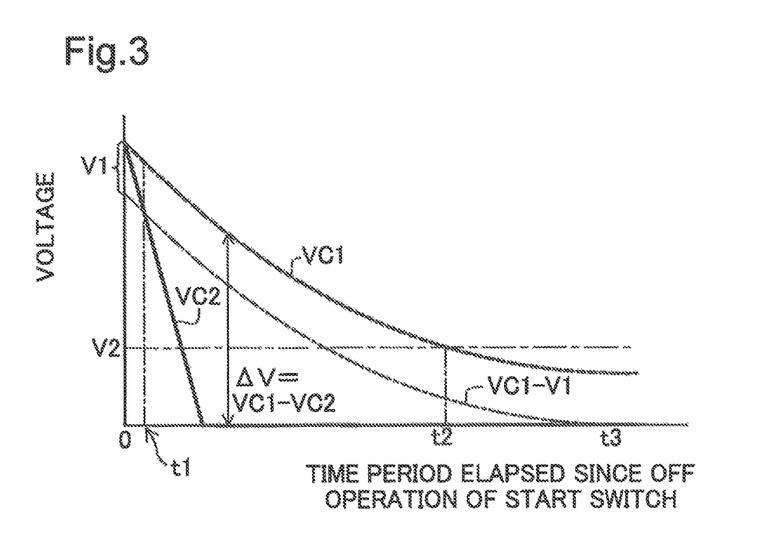
FIG. 3 is a graph showing variations in the voltage of the first smoothing capacitor and in the voltage of the second smoothing capacitor against a time period elapsed since an OFF operation of the start switch.

FIG. 3 is a graph showing variations in the voltage VC1 of the first smoothing capacitor C1 and in the voltage VC2 of the second smoothing capacitor C2 against a time period elapsed since an OFF operation of the start switch 410. The second smoothing capacitor C2 is connected with the HV auxiliary machinery 320, so that the voltage VC2 of the second smoothing capacitor C2 is abruptly decreased in response to an OFF operation of the start switch 410. When the start switch 410 is turned off so as to turn off the relays RL1a and RL1b, on the other hand, the first smoothing capacitor is separated from the HV auxiliary machinery 320. The voltage VC1 of the first smoothing capacitor C1 is thus decreased only slowly. Accordingly, depending on the time period between an OFF operation and a next ON operation of the start switch 410, there may be a large voltage difference ΔV between the voltage VC1 of the first smoothing capacitor C1 and the voltage VC2 of the second smoothing capacitor C2. When the relay RL3 of the first precharge circuit 130 is switched on to perform a precharge operation after an ON operation of the start switch 410, the large voltage difference ΔV is likely to cause an excessively high current to flow through the first precharge circuit 130. The first embodiment accordingly changes the procedure of the starting operation according to the voltages of the two smoothing capacitors C1 and C2 as described below.

Figure 4:
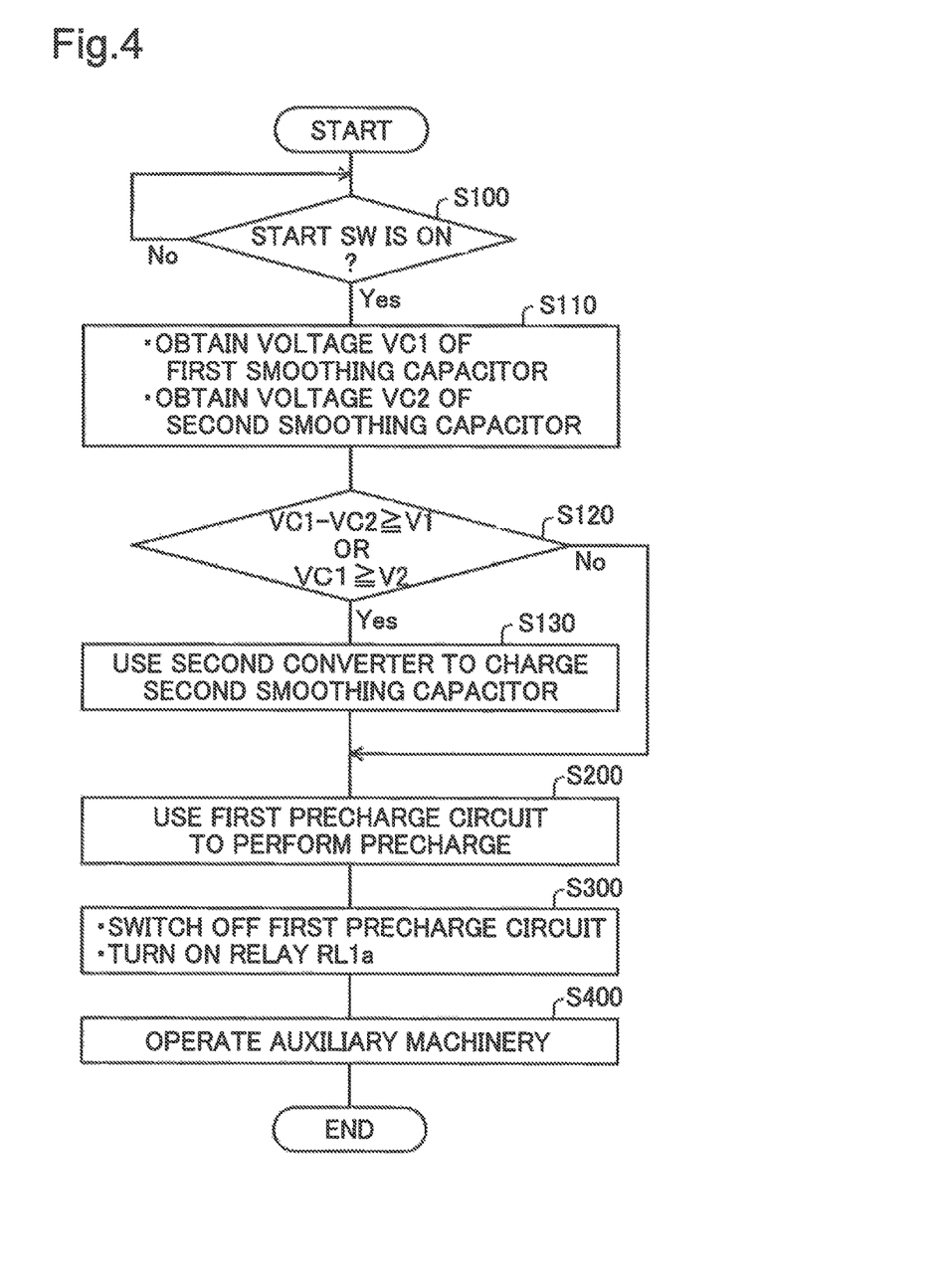
FIG. 4 is a flowchart showing a starting operation according to the first embodiment.

FIG. 4 is a flowchart showing a starting operation according to the first embodiment. The difference from the basic starting operation shown in FIG. 2 is that steps S110, S120 and S130 are added between step S100 and step S200.

When the start switch 410 is turned on at step S100, the controller 400 uses the first voltage sensor 125 to obtain the voltage VC1 of the first smoothing capacitor C1 and uses the second voltage sensor 225 to obtain the voltage VC2 of the second smoothing capacitor C2 at step S110. The controller 400 subsequently determines whether at least one of two conditions given below is satisfied at step S120. The word "or" at step S120 in the flowchart of FIG. 4 is used in the sense of at least one of (the same applies to the flowcharts of FIG. 6 and FIG. 8).

Condition i: The difference between the voltage VC1 of the first smoothing capacitor C1 and the voltage VC2 of the second smoothing capacitor C2 is equal to or greater than a first reference value V1.

$VC1-VC2 \geq V1$

Condition ii: The voltage VC1 of the first smoothing capacitor C1 is equal to or higher than a second reference value V2.

$VC1 \geq V2$

These reference values V1 and V2 satisfy $V2 \geq V1$ as illustrated in FIG. 3 and are determined in advance by experiment or the like. As described later, these conditions i and ii are set to determine that there is an excessively large difference between the two voltages VC1 and, VC2 when at least one of these conditions i and ii is satisfied. When there is an excessively large difference between the two voltage VC1 and VC2, an excessively high current is made to flow by simply switching on the first precharge circuit 130. The processing of step S130 described below is thus performed, prior to the precharge operation performed at step S200.

The condition i is provided as a condition that allows the controller 400 to directly determine that there is an excessively large difference between the two voltages VC1 and VC2. In the illustrated example of FIG. 3, the condition i is satisfied for a time period between a time t1 and a time t3 after an OFF operation of the start switch 410. The voltage VC2 of the second smoothing capacitor C2 is abruptly decreased as shown in FIG. 3. The voltage VC2 is thus likely to become approximately equal to 0 after some time since the OFF operation of the start switch 410. Accordingly the controller 400 is allowed to determine that there is an excessively large difference between the two voltages VC1 and VC2 when the condition ii with regard to the voltage VC1 of the first smoothing capacitor C1 is satisfied. In this case, the controller 400 may not use the second voltage sensor 225 but may use only the first voltage sensor 125 for the determination. In the illustrated example of FIG. 3, the condition ii is satisfied until a time t2 after the OFF operation of the start switch 410. The conditions i and ii become substantially equal to each other when the two reference values V1 and V2 are set equal to each other. Accordingly conditions including at least one of the above two conditions i and ii may be employed as the condition of determination at step S120. Also, if only the conditions ii may be employed, the second voltage sensor 225 may be omitted.

When it is determined that at least one of the conditions i and ii is satisfied at step S120, the controller 400 proceeds to step S130. When neither of the conditions i and ii is satisfied, on the other hand, the controller 400 proceeds to step S200.

At step S130, the controller 400 uses the second converter 220 to charge the second smoothing capacitor C2, such that the voltage VC2 of the second smoothing capacitor C2 becomes closer to the voltage VC1 of the first smoothing capacitor C1. The controller 400 proceeds to step S200 when the difference between the two voltages VC1 and VC2 is reduced to or below a predetermined value or when a predetermined time period has elapsed since a start of charging the second smoothing capacitor C2.

At step S200, the controller 400 uses the first precharge circuit 130 to perform the precharge operation. In this state, since the difference between the two voltages VC1 and VC2 is sufficiently small, no excessively high current is made to flow through the first precharge circuit 130 even when the controller 400 proceeds to step S200 to switch on the first precharge circuit 130. The conditions i and ii are set such that no excessively high current is made to flow through the first precharge circuit 130 by switching on the first precharge circuit 130 when neither of the conditions i and ii is satisfied. Accordingly no excessively high current is made to flow through the first precharge circuit 130 even when the controller 400 proceeds from step S110 to step S200 to switch on the first precharge circuit 130. After the processing of step S200, the controller 400 sequentially performs the processing of steps S300 and S400, like the flow of FIG. 2.

Figure 5:
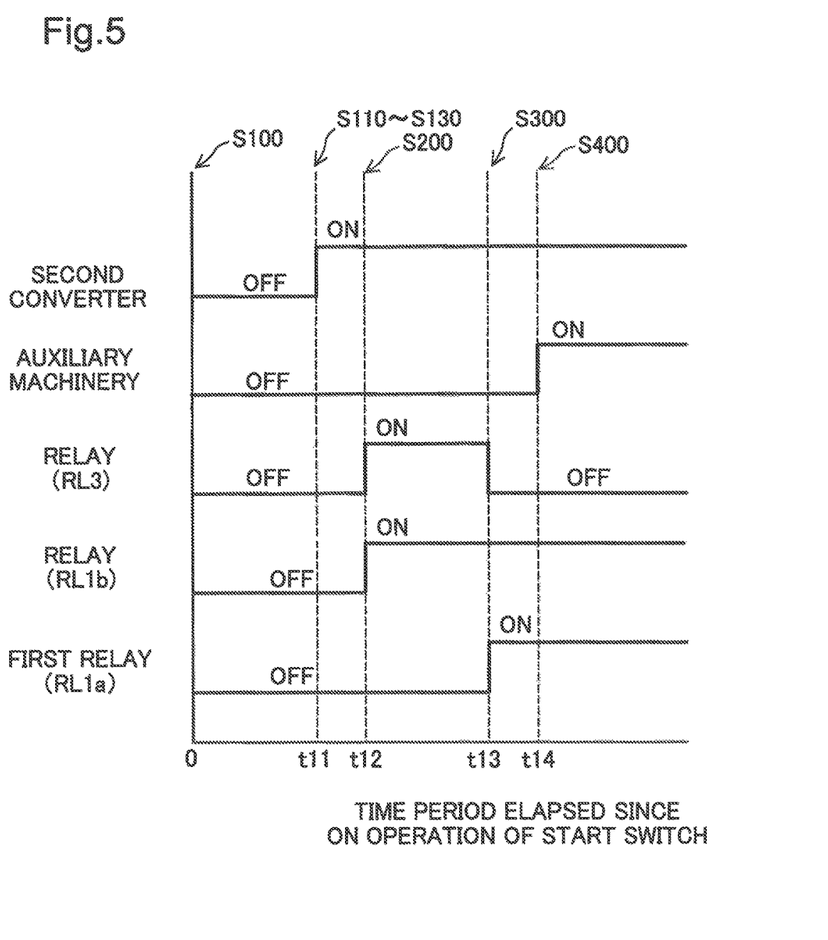
FIG. 5 is a timing chart with regard to the starting operation of the power circuit that follows the flowchart of FIG. 4.

FIG. 5 is a timing chart with regard to the starting operation of the power circuit that follows the flowchart of FIG. 4. It is assumed that the start switch 410 is switched from off to on at a time 0 (step S100). At a time t11, the controller 400 performs the processing of steps S110 and S120 shown in FIG. 4 to determine whether at least one of the above conditions i and ii is satisfied. In the illustrated example of FIG. 5, at least one of the above conditions i and ii is satisfied at the time t11. The controller 400 then proceeds to the processing of step S130 described above to start charging the second smoothing capacitor C2 using the second converter 220.

At a subsequent time t12, the controller 400 performs the processing of step S200 shown in FIG. 4. More specifically, the controller 400 turns on the relay RL3 and the relay RL1b and performs the precharge operation using the first precharge circuit 130. At a time t13, when the precharge operation is terminated, the controller 400 performs the processing of step S300 show in FIG. 4 to turn off the relay RL3 so as to switch off the first precharge circuit 130 and to turn on the first relay RL1a. At a subsequent time t14, the controller 400 then performs the processing of step S400 to operate the auxiliary machinery 320 and 330 and make the fuel cell 100 ready for power generation.

According to this embodiment, after the first relay RL1a is turned on to connect the fuel cell 100 with a load (inverter 300) at the time t13, the controller 400 operates the auxiliary machinery 320 and 330 at the time t14. This series of operations aims to prevent the fuel cell 100 from falling into a high voltage state of OCV (open circuit voltage). As is known in the art, the fuel cell 100 is operated at OCV without supply of electric current in the state that reactive gases are supplied, and this causes degradation of the fuel cell 100. Operation of the auxiliary machinery 320 and 330 (especially operation of the air compressor) prior to connection of the fuel cell 100 with the load is likely to cause the fuel cell 100 to be operated at OCV and thereby cause degradation of the fuel cell 100. This embodiment, however, operates the auxiliary machinery 320 and 330 after connection of the fuel cell 100 with the load and is thus unlikely to cause degradation of the fuel cell 100.

As described above, according to the embodiment, at the time of an ON operation of the start switch 410, when the voltages VC1 and VC2 of the two smoothing capacitors C1 and C2 satisfy at least one of the above conditions i and ii, the controller 400 uses the second converter 220 to charge the second smoothing capacitor C2 and subsequently switches on the first precharge circuit 130 to perform the precharge operation. This series of operations sufficiently reduces the difference between the voltages VC1 and VC2 of the two smoothing capacitors C1 and 02 before the first precharge circuit 130 is switched on. This results in sufficiently reducing the electric current flowing through the first precharge circuit 130. This also enables downsizing of the first precharge circuit 130.

Second Embodiment

Figure 6:
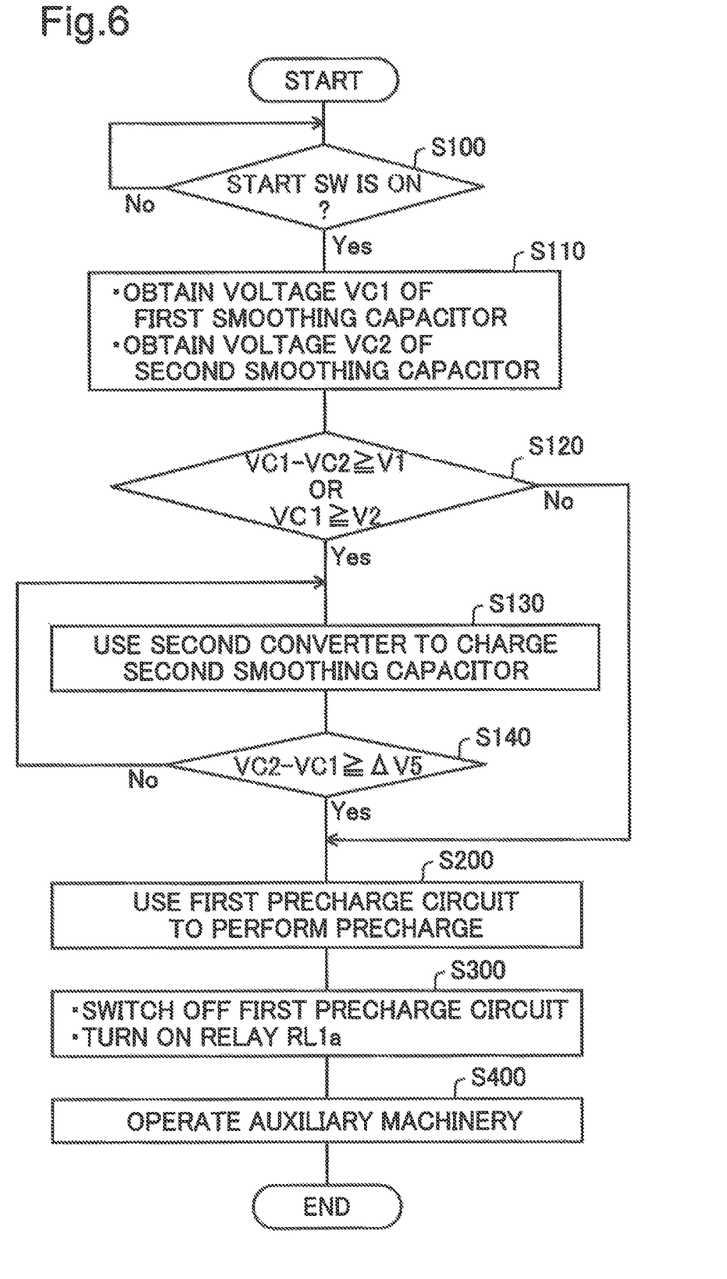
FIG. 6 is a flowchart showing a starting operation according to a second embodiment.

FIG. 6 is a flowchart showing a starting operation according to a second embodiment. A fuel cell system of the second embodiment has a similar configuration to that of the first embodiment. The second embodiment differs from the first embodiment only by addition of step S140 between step S130 and step S200.

At step S140, the controller 400 determines whether the voltage VC2 of the second smoothing capacitor C2 measured by the second voltage sensor 225 becomes higher than the voltage VC1 of the first smoothing capacitor C1 measured by the first voltage sensor 125 by a predetermined reference value ΔV5 or more. The reference value ΔV5 is set such that the actual voltage of the second smoothing capacitor C2 becomes equal to or higher than the actual voltage of the first smoothing capacitor C1 when the measured voltage difference (VC2=VC1) is equal to or greater than the reference value ΔV5 even in the case of a worst possible condition taking account of errors of the two voltage sensors 125 and 225.

When it is determined at step S140 that the voltage VC2 of the second smoothing capacitor C2 is higher than the voltage VC1 of the first smoothing capacitor C1 by the predetermined reference value ΔV5 or more, the controller 400 proceeds to step S200. When this condition is not satisfied at step S140, on the other hand, the controller 400 returns to step S130 to continue charging.

When the condition of step S140 is satisfied, the controller 400 sequentially performs the processing of steps S200, S300 and S400, like the flow of FIG. 4. According to the second embodiment, since the actual voltage of the second smoothing capacitor C2 is higher than the actual voltage of the first smoothing capacitor C1, electric current is made to flow through the first precharge circuit 130 from the second smoothing capacitor C2 toward the first smoothing capacitor C1 when the controller 400 proceeds from step S140 to step S200.

As shown in FIG. 1, the reactor L3 is connected with the relay RL3 in the first precharge circuit 130. For example, when an electromagnetic switch is employed for the relay RL3, arc current flows instantaneously in response to switching of the relay RL3 from off to on. A relay generally has polarity. Adapting the polarity of a relay for the direction of arc current that flows instantaneously in response to an ON operation of the relay is less likely to cause a failure (for example, welding) of even a small-capacity relay due to the arc current. When there is a possibility that the arc current flows in two directions in response to an ON operation of the relay, a larger-capacity relay is needed for the arc current flowing in the two directions. The configuration of the second embodiment, on the other hand, turns on the relay RL3 so as to switch on the first precharge circuit 130 after the actual voltage of the second smoothing capacitor C2 becomes higher than the actual voltage of the first smoothing capacitor C1. This limits the direction of arc current flowing through the relay RL3 to only one direction. As a result, this enables downsizing of the relay RL3 and thereby downsizing of the first precharge circuit 130. When a semiconductor relay is employed for the relay RL3, simplification of the configuration is similarly achievable when the flow direction of electric current is limited to only one direction.

As described above, according to this embodiment, the controller 400 switches the first precharge circuit 130 from off to on when the voltage VC2 of the second smoothing capacitor C2 measured by the second voltage sensor 225 becomes higher than the voltage VC1 of the first smoothing capacitor C1 measured by the first voltage sensor 125 by the predetermined reference value ΔV5 or more. This limits the direction of electric current flowing through the relay RL3 to only one direction. As a result, the relay RL3 is not required to be adapted for the electric current flowing in two directions. Adapting the polarity of the relay RL3 for the direction of electric current flowing through the relay RL3 enables downsizing of the relay RL3 and thereby downsizing of the first precharge circuit 130.

Third Embodiment

Figure 7:
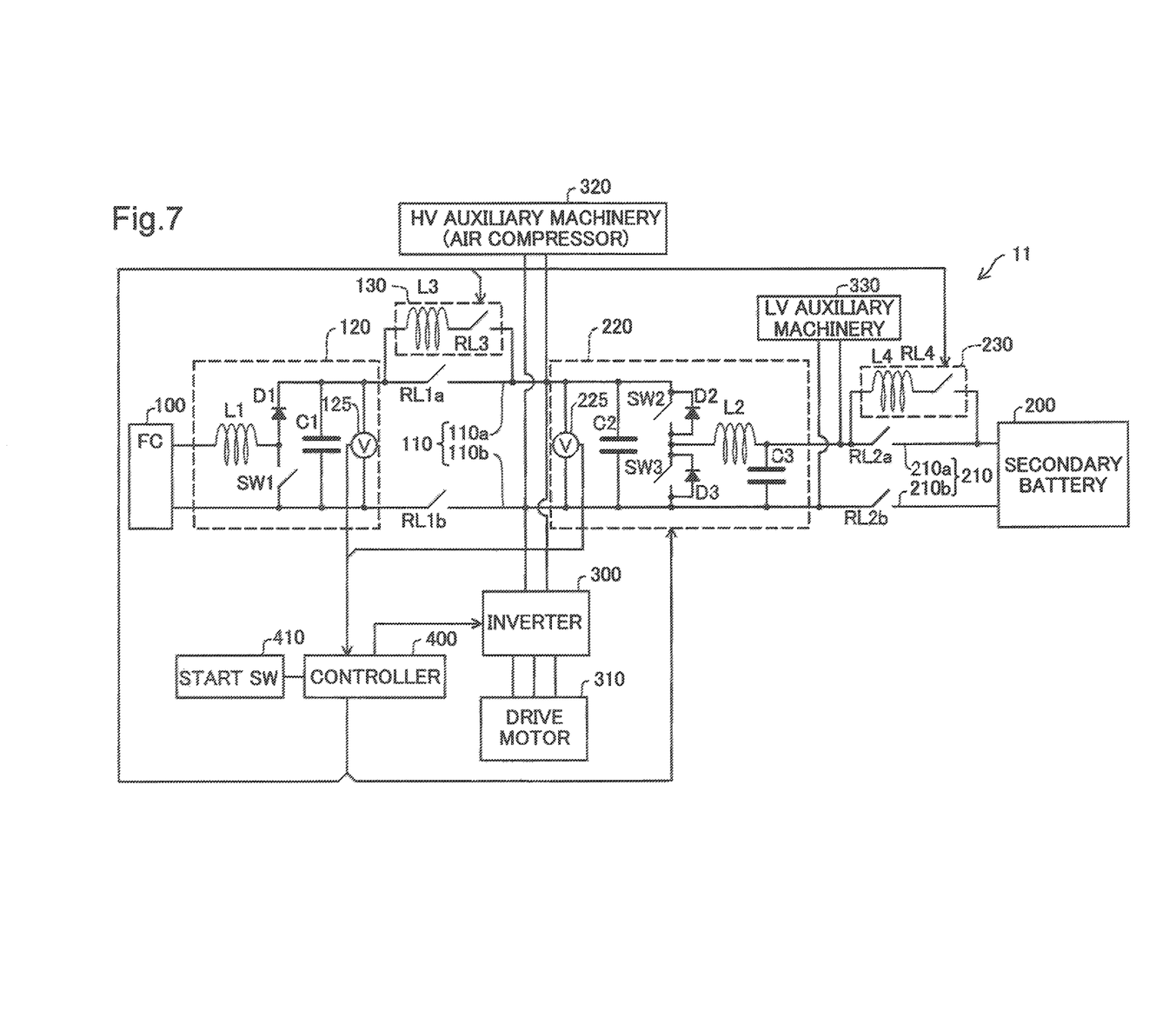
FIG. 7 is a diagram illustrating the configuration of a fuel cell system according to a third embodiment.

FIG. 7 is a diagram illustrating the configuration of a fuel cell system 11 according to a third embodiment. The fuel cell system 11 of the third embodiment differs from the fuel cell system 10 of the first embodiment by that a relay RL2a (second relay) is added to the high potential-side wiring 210a of the low voltage wiring 210, that a relay RL2b is added to the low potential-side wiring 210b and that a second precharge circuit 230 is added in parallel to the relay RL2a. The second precharge circuit 230 may include a reactor L4 and a relay RL4 that is connected in series with the reactor L4. The relay RL2b of the low potential-side wiring 210b may be omitted as appropriate.

Figure 8:
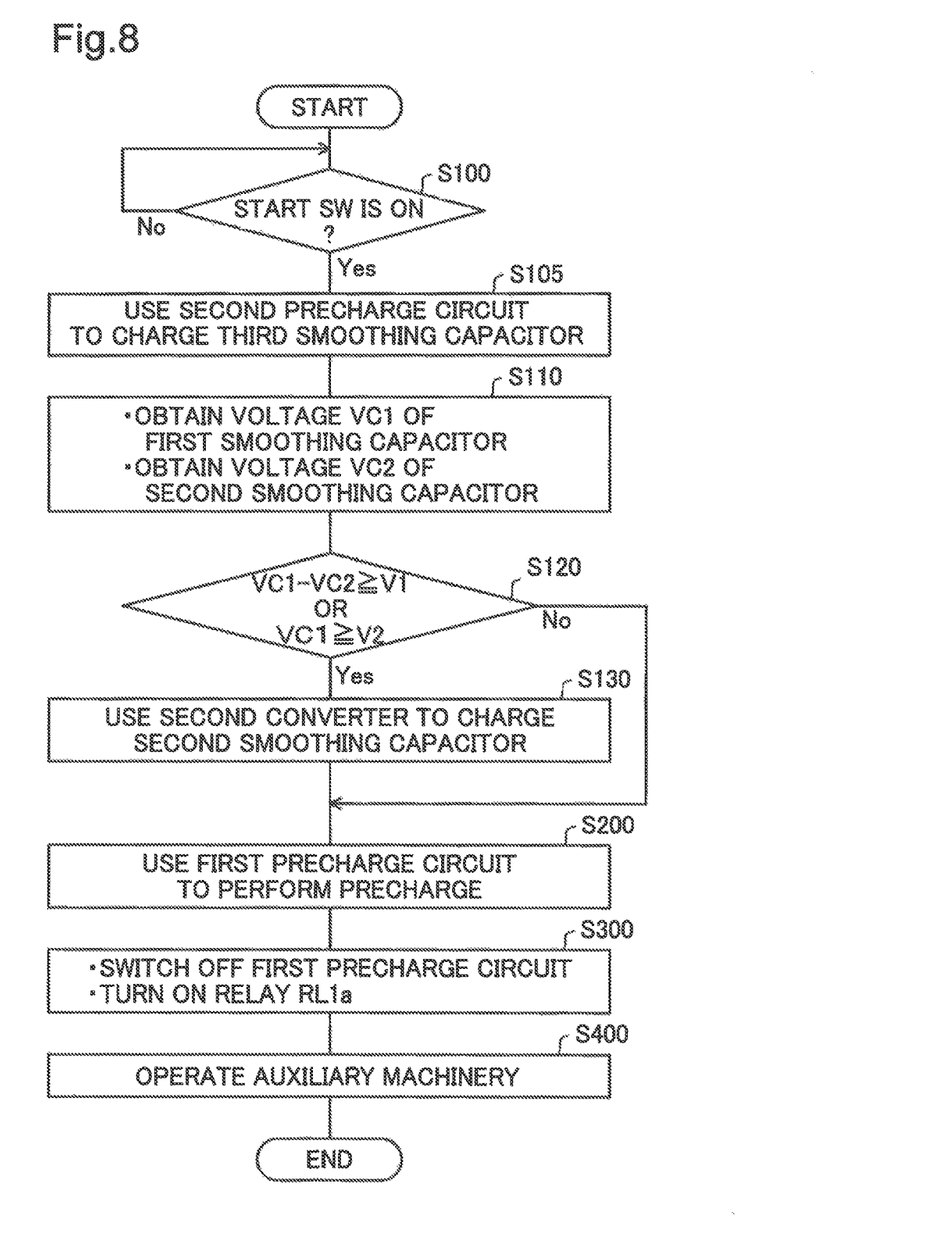
FIG. 8 is a flowchart showing a starting operation of the power circuit of the third embodiment.

FIG. 8 is a flowchart showing a starting operation of the power circuit of the third embodiment. The difference from the flowchart of the first embodiment shown in FIG. 4 is that step S105 is added between step S100 and step S110. When the start switch 410 is turned on at step S100, the controller 400 turns on the relays RL2b and RL4 so as to switch on the second precharge circuit 230 and charge the third smoothing capacitor C3 (precharge operation) at step S105. When the voltage of the third smoothing capacitor C3 becomes approximately equal to the voltage of the secondary battery 100 or when a predetermined time period has elapsed since an ON operation of the second precharge circuit 230, the controller 400 switches off the second precharge circuit 230 (by turning off the relay RL4) and turns on the relay RL2a. The controller 400 subsequently proceeds to step S110. It may be determined whether the voltage of the third smoothing capacitor C3 becomes approximately equal to the voltage of the secondary battery 200, based on the current value of a current sensor (not shown) provided in the secondary battery 200. The controller 400 then performs a subsequent series of operations similar to those of the first embodiment. A voltage sensor may be additionally provided to measure the voltage of the third smoothing capacitor C3.

Addition of the processing of step S105 provides the following advantageous effects. In the configuration that the relays RL2a and RL2b are provided between the secondary battery 200 and the second converter 220, when the relays RL2a and RL2b are turned on and the second converter 220 is used to charge the second smoothing capacitor C2 at step S130 with omission of step S105, there is a possibility that a high current flows in the process of charging the two smoothing capacitors C2 and C3. Charging the third smoothing capacitor C3 in advance at step S105 as shown in FIG. 8, on the other hand, can reduce the electric current flowing in the process of charging at step S130.

The configuration of the third embodiment charges the third smoothing capacitor C3, before charging the second smoothing capacitor C2. This configuration prevents an excessively high current from flowing in the process of charging the second smoothing capacitor C2. This configuration also prevents an excessively high current from flowing through the relay RLA2a when the relay RL2a is turned on. The configuration of the third embodiment also provides the advantageous effects similar to those of the first embodiment described above, for example, reducing the electric current flowing through the first precharge circuit 130 when the first precharge circuit 130 is switched on.

Fourth Embodiment

Figure 9:
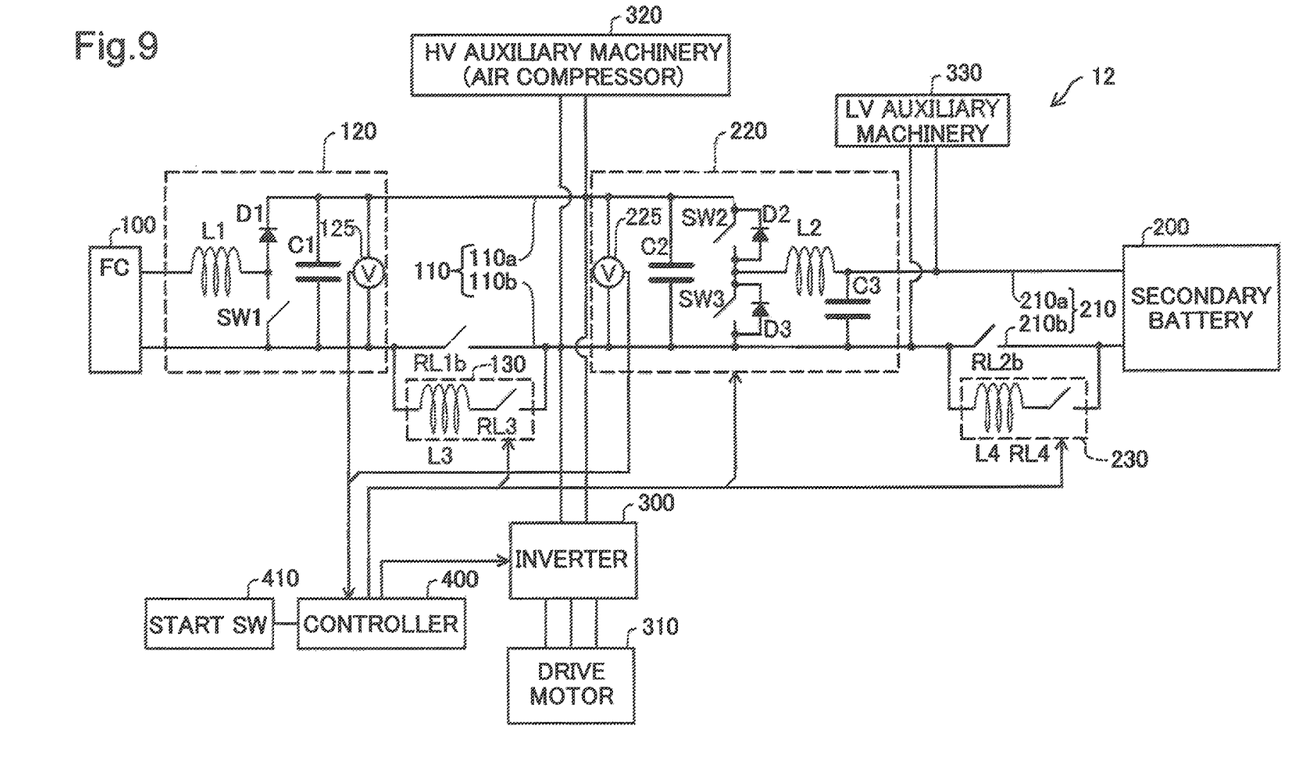
FIG. 9 is a diagram illustrating the configuration of a fuel cell system 12 according to a fourth embodiment.

FIG. 9 is a diagram illustrating the configuration of a fuel cell system 12 according to a fourth embodiment. The fuel cell system 12 of the fourth embodiment differs from the fuel cell system 11 of the third embodiment by that the first precharge circuit 130 is connected with the low potential-side wiring 110b, that the second precharge circuit 230 is connected with the low potential-side wiring 210b, and that the relay RL1a of the high potential-side wiring 110a and the relay RL2a of the high potential-side wiring 210a are omitted. The fuel cell system 12 of the fourth embodiment is allowed to perform a series of operations similar to those of the third embodiment and accordingly provides advantageous effects similar to those of the third embodiment.
Modification 1:
In the respective embodiments described above, the non-insulated type DC-to-DC converter is employed for the first converter 120 and the second converter 220. An insulated type DC-to-DC converter may be used in place of the non-insulated type.
Modification 2
The respective embodiments described above use the precharge circuits 130 and 230, each including a reactor. The precharge circuit may be configured to include a resistance, in place of or in addition to the reactor. In other words, the precharge circuit used may be configured as any bypass conduction path that is allowed to be switched on and off and that includes a reactor or a resistance.

The foregoing describes some aspects of the disclosure with reference to some embodiments. The embodiments of the disclosure described above are provided only for the purpose of facilitating the understanding of the disclosure and not for the purpose of limiting the disclosure in any sense. The disclosure may be changed, modified and altered without departing from the scope of the disclosure and includes equivalents thereof.

What is claimed is:

1. A fuel cell system, comprising:
a fuel cell;
a secondary battery;
a first converter connected with the fuel cell, the first converter being provided as a DC-to-DC converter that includes a first smoothing capacitor for use in stepping up voltage;
a second converter connected with the first converter via high voltage wiring and connected with the secondary battery via low voltage wiring, the second converter being provided as a DC-to-DC converter that includes a second smoothing capacitor for use in stepping up voltage;
a first relay provided in the high voltage wiring;
a first precharge circuit connected in parallel to the first relay and configured as a bypass conduction path that is configured to be switched on and off and that includes a reactor or a resistance;
a voltage sensor configured to measure at least, a voltage of the first smoothing capacitor, out of the voltage of the first smoothing capacitor and a voltage of the second smoothing capacitor;
a start switch for use in switching on and off the fuel cell system; and a controller, wherein
when the start switch is turned on in a system-off state where the first relay is off, the controller performs a starting operation that switches on the first precharge circuit so as to reduce a voltage difference between the first smoothing capacitor and the second smoothing capacitor and subsequently turns on the first relay, wherein
in the starting operation the controller obtains at least the voltage of the first smoothing capacitor out of the voltage of the first smoothing capacitor and the voltage of the second smoothing capacitor, and
upon satisfaction of a predetermined condition including at least one of a condition that the voltage difference between the first smoothing capacitor and the voltage of the second smoothing capacitor is equal to or greater than a first reference value and a condition that the voltage of the first smoothing capacitor is equal to or higher than a second reference value, the controller uses the second converter to charge up the second smoothing capacitor so as to bring the voltage of the second smoothing capacitor closer to the voltage of the first smoothing capacitor, and subsequently switches the first precharge circuit from off to on.

2. The fuel cell system according to claim 1,
wherein the first precharge circuit includes a precharge circuit relay configured to switch on and off the first precharge circuit, and
the voltage sensor includes a first voltage sensor configured to measure the voltage of the first smoothing capacitor and a second voltage sensor configured to measure the voltage of the second smoothing capacitor, wherein
in the starting operation the controller switches the precharge circuit relay from off to on so as to switch on the first precharge circuit, when the voltage of the second smoothing capacitor becomes higher than the voltage of the first smoothing capacitor by a predetermined reference value or more after the charging up of the second smoothing capacitor.

3. The fuel cell system according to claim 2, further comprising:
a second relay provided in the low voltage wiring; and
a second precharge circuit connected in parallel to the second relay, wherein
the second converter includes a third smoothing capacitor for use in stepping down voltage provided on a low voltage wiring side thereof, wherein
in the starting operation the controller uses the second battery to charge up the third smoothing capacitor via the second precharge circuit, before the charging up of the second smoothing capacitor.

4. The fuel cell system according to claim 1, further comprising:
a second relay provided in the low voltage wiring; and
a second precharge circuit connected in parallel to the second relay, wherein
the second converter includes a third smoothing capacitor for use in stepping down voltage provided on a low voltage wiring side thereof, wherein
in the starting operation the controller uses the second battery to charge up the third smoothing capacitor via the second precharge circuit, before the charging up of the second smoothing capacitor.

5. A method of controlling of a fuel cell system, the fuel cell system comprising a fuel cell; a secondary battery; a first converter connected with the fuel cell, the first converter being provided as a DC-to-DC converter that includes a first smoothing capacitor for use in stepping up voltage; a second converter connected with the first converter via high voltage wiring and connected with the secondary battery via low voltage wiring, the second converter being provided as a DC-to-DC converter that includes a second smoothing capacitor for use in stepping up voltage; a first relay provided in the high voltage wiring; a first precharge circuit connected in parallel to the first relay and configured as a bypass conduction path that is configured to be switched on and off and that includes a reactor or a resistance; and a start switch for use in switching on and off the fuel cell system, the method comprising the steps of:

when the start switch is turned on in a system-off state where the first relay is off, performing a starting operation that switches on the first precharge circuit so as to reduce a voltage difference between the first smoothing capacitor and the second smoothing capacitor and subsequently turns on the first relay, wherein the starting operation includes:

obtaining at least a voltage of the first smoothing capacitor out of the voltage of the first smoothing capacitor and a voltage of the second smoothing capacitor, and upon satisfaction of a predetermined condition including at least one of a condition that a difference between the voltage of the first smoothing capacitor and the voltage of the second smoothing capacitor is equal to or greater than a first reference value and a condition that the voltage of the first smoothing capacitor is equal to or higher than a second reference value, using the second converter to charge up the second smoothing capacitor so as to bring the voltage of the second smoothing capacitor closer to the voltage of the first smoothing capacitor, and subsequently switching the first precharge circuit from off to on.

6. A method of controlling of a fuel cell system, the fuel cell system comprising a fuel cell; a secondary battery; a first converter connected with the fuel cell, the first converter being provided as a DC-to-DC converter that includes a first smoothing capacitor for use in stepping up voltage; a second converter connected with the first converter via high voltage wiring and connected with the secondary battery via low voltage wiring, the second converter being provided as a DC-to-DC converter that includes a second smoothing capacitor for use in stepping up voltage; a first relay provided in the high voltage wiring; a first precharge circuit connected in parallel to the first relay and configured as a bypass conduction path that is configured to be switched on and off and that includes a reactor or a resistance; and a start switch for use in switching on and off the fuel cell system, the method comprising the steps of:

when the start switch is turned on in a system-off state where the first relay is off, performing a starting operation that switches on the first precharge circuit so as to reduce a voltage difference between the first smoothing capacitor and the second smoothing capacitor and subsequently turns on the first relay, wherein the starting operation includes:

obtaining at least a voltage of the first smoothing capacitor out of the voltage of the first smoothing capacitor and a voltage of the second smoothing capacitor, and upon satisfaction of a predetermined condition including at least one of a condition that the voltage difference between the first smoothing capacitor and the voltage of the second smoothing capacitor is equal to or greater than a first reference value and a condition that the voltage of the first smoothing capacitor is equal to or higher than a second reference value, using the second converter to charge up the second smoothing capacitor so as to bring the voltage of the second smoothing capacitor closer to the voltage of the first smoothing capacitor, and subsequently switching the first precharge circuit from off to on.

7. The method according to claim 6, the fuel cell system further comprising: a second relay provided in the low voltage wiring; and a second precharge circuit connected in parallel to the second relay, wherein the second converter includes a third smoothing capacitor for use in stepping down voltage provided on a low voltage wiring side thereof, wherein the starting operation further comprising the step of:

using the second battery to charge up the third smoothing capacitor via the second precharge circuit, before the charging up of the second smoothing capacitor.

8. The method according to claim 5, the fuel cell system further comprising: a second relay provided in the low voltage wiring; and a second precharge circuit connected in parallel to the second relay, wherein the second converter includes a third smoothing capacitor for use in stepping down voltage provided on a low voltage wiring side thereof, wherein the starting operation further comprising the step of:

using the second battery to charge up the third smoothing capacitor via the second precharge circuit, before the charging up of the second smoothing capacitor.

\* \* \* \* \*

UNITED STATES PATENT AND TRADEMARK OFFICE
CERTIFICATE OF CORRECTION

PATENT NO. : 10,181,727 B2
APPLICATION NO. : 15/401397
DATED : January 15, 2019
INVENTOR(S) : Koji Katano et al.

It is certified that error appears in the above-identified patent and that said Letters Patent is hereby corrected as shown below:

In the Claims

In Claim 1, at Column 12, Line 13, delete "the voltage of".

In Claim 5, at Column 13, Lines 24-26, "a difference between the voltage of the first smoothing capacitor and the voltage of the second smoothing capacitor," should read --the voltage difference between the first smoothing capacitor and the second smoothing capacitor--.

In Claim 6, Column 13, Line 36 through Column 14, Line 26, delete the claim in its entirety and insert in its place the following:
--6. The method according to claim 5,
    wherein the first precharge circuit includes a precharge circuit relay configured to switch on and off the first precharge circuit, and
    wherein the starting operation further comprising the step of:
    switching the precharge circuit relay from off to on so as to switch on the first precharge circuit, when a voltage of the second smoothing capacitor becomes higher than a voltage of the first smoothing capacitor by a predetermined reference value or more after the charging up of the second smoothing capacitor.--.

Signed and Sealed this
Fourteenth Day of May, 2019

Andrei Iancu
*Director of the United States Patent and Trademark Office*